(12) United States Patent
Leitner

(10) Patent No.: US 8,522,333 B2
(45) Date of Patent: Aug. 27, 2013

(54) CLIENT/SERVER SYSTEM FOR COMMUNICATING ACCORDING TO THE STANDARD PROTOCOL OPC UA AND HAVING SINGLE SIGN-ON MECHANISMS FOR AUTHENTICATING, AND METHOD FOR PERFORMING SINGLE SIGN-ON IN SUCH A SYSTEM

(75) Inventor: Stefan H. Leitner, Heidelberg (DE)

(73) Assignee: ABB Research Ltd, Zurich (CH)

( * ) Notice: Subject to any disclaimer, the term of this patent is extended or adjusted under 35 U.S.C. 154(b) by 264 days.

(21) Appl. No.: 12/858,137

(22) Filed: Aug. 17, 2010

(65) Prior Publication Data

US 2011/0035792 A1 Feb. 10, 2011

Related U.S. Application Data

(63) Continuation of application No. PCT/EP2009/000772, filed on Feb. 5, 2009.

(30) Foreign Application Priority Data

Feb. 26, 2008 (DE) .......................... 10 2008 011 191

(51) Int. Cl.
*H04L 29/06* (2006.01)
(52) U.S. Cl.
USPC .................................. 726/8; 726/7; 709/225
(58) Field of Classification Search
None
See application file for complete search history.

(56) References Cited

U.S. PATENT DOCUMENTS

| 6,892,307 | B1 | | 5/2005 | Wood et al. | |
|---|---|---|---|---|---|
| 7,093,291 | B2 | * | 8/2006 | Bailey | 726/23 |
| 8,091,119 | B2 | * | 1/2012 | Brown et al. | 726/4 |
| 8,151,317 | B2 | * | 4/2012 | Hinton et al. | 726/1 |
| 8,423,608 | B2 | * | 4/2013 | Mahnke | 709/203 |
| 2004/0098615 | A1 | * | 5/2004 | Mowers et al. | 713/201 |
| 2007/0143829 | A1 | * | 6/2007 | Hinton et al. | 726/5 |
| 2010/0281097 | A1 | * | 11/2010 | Mahnke | 709/201 |
| 2010/0306313 | A1 | * | 12/2010 | Mahnke | 709/203 |

FOREIGN PATENT DOCUMENTS

| WO | WO 01/11450 A | 2/2001 |
|---|---|---|
| WO | WO 2007/068716 A | 6/2007 |

OTHER PUBLICATIONS

Leitner SH, Mahnke W. OPC UA-Service-oriented architecture for industrial applications. Softwaretechnik—Trends 2006; 26(4):27-33.*
International Search Report (PCT/ISA/210) issued on Sep. 25, 2009, by European Patent Office as the International Searching Authority for International Application No. PCT/EP2009/000772.

* cited by examiner

*Primary Examiner* — Michael R Vaughan
(74) *Attorney, Agent, or Firm* — Buchanan Ingersoll & Rooney PC

(57) ABSTRACT

A method and device are provided for integrating single sign-on (SSO) mechanisms in a client/server system using communication according to the standard protocol OPC UA, and for performing SSO for user authentication and authorization in the system. A client is connected to an aggregating server, and the aggregating server is connected to subordinated servers via a communication network. To integrate SSO mechanisms, the aggregating server is provided with an SSO component for mapping user legitimation data used in a service call to identities in the form in which the identities are stored in the subordinate servers. To perform SSO using the SSO component, user legitimation data associated with a service call are used to automatically search for corresponding mapped identities and affected servers, and to call up an active session service for each match in each server via the mapped identity, to establish the desired access to data from the user's service invocation.

12 Claims, 4 Drawing Sheets

CLIENT/SERVER SYSTEM FOR COMMUNICATING ACCORDING TO THE STANDARD PROTOCOL OPC UA AND HAVING SINGLE SIGN-ON MECHANISMS FOR AUTHENTICATING, AND METHOD FOR PERFORMING SINGLE SIGN-ON IN SUCH A SYSTEM

RELATED APPLICATIONS

This application claims priority as a continuation application under 35 U.S.C. §120 to PCT/EP2009/000772, which was filed as an International Application on Feb. 5, 2009 designating the U.S., and which claims priority to German Application 10 2008 011 191.0 filed in Germany on Feb. 26, 2006. The entire contents of these applications are hereby incorporated by reference in their entireties.

FIELD

The present disclosure relates to a method and a device for integrating user authentication and authorization mechanisms in applications according to the standard protocol OPC UA. The method and the device are suitable for different applications, such as for communication in automation systems, for example.

BACKGROUND INFORMATION

OPC UA is a new standard protocol for manufacturer-independent and platform-independent communication, such as in process automation, specified by the OPC Foundation. Although the original name for OPC was Object Linking and Embedding (OLE) for Process Control, OPC has been used in the meantime without any indication of an abbreviation. UA stands for Unified Architecture.

FIG. 1a) illustrates a known arrangement for interaction between an OPC UA client 11 and an OPC UA server 13 according to the OPC UA specification using a communication system 12, such as a network. In this case, the OPC UA client 11 uses OPC UA service calls from a set of OPC UA service calls specified in the OPC UA protocol for interaction. However, an OPC UA server can also operate as an aggregating server, as illustrated in FIG. 1b). Such an aggregating OPC UA server 14 can act as a client for other, subordinate OPC UA servers 13. As such, the aggregating OPC UA server 14 can collect data provided by these other OPC UA servers 13 and can provide the data in its own address space.

The field of application for OPC UA clients and servers encompasses a wide range and their function can be implemented in different devices and systems, such as controllers, PC-based control systems, production management systems, or in production planning, for example.

However, the standard protocol OPC UA does not define any mechanisms for authenticating and authorizing users in a scenario with aggregating servers. The specification provides that aggregating servers may have a plurality of users which act as their agents and which can be used to set up sessions, which are independent of one another, in conjunction with the other servers. However, the relationship between the identity of a client user and identities in the aggregating server is not specified. This means that it is optional whether client identities match identities of the other servers or whether, instead, independent superordinate users are formed for access to aggregating servers.

In order to achieve a suitable security level in OPC UA systems, it is important to support fine-grained access control for users and to comply with the stipulated "least privileges" protection for each user accessing data. A concept with superordinate users in the aggregating server for client identities would breach the design objectives.

Mechanisms for so-called single sign-on would be desirable in OPC UA systems. Single sign-on (SSO) mechanisms allow a user to access all applications and data according to a previously defined individual permission following input authentication. The user advantageously does not need to log on again within a computer system.

Although different types of standard solutions for single sign-on are known in information technology, these SSO solutions cannot be used in OPC UA products because they are based on a central authentication server, where a user is required to log on via a web interface and the server allocates the access authorization for a predefined set of applications. Such authentication servers use http or other web protocols to identify users and allocate access authorizations for other applications. However, http or other web protocols is/are not always allowed or available in automation networks and, in addition, not every OPC UA application is a web application. Furthermore, the authentication server would have to understand the OPC UA protocol in order to authenticate a user for an OPC UA server. However, this is not the case with products currently on the market.

SUMMARY

An exemplary embodiment provides a method for integrating single sign-on (SSO) mechanisms in a client/server system with communication according to the OPC UA protocol and for performing single sign-on for user authentication in the system. The system includes an OPC UA client which is connected to an OPC UA aggregating server, which in turn is connected to subordinate OPC UA servers by means of a communication network. The exemplary method includes providing, in order to integrate SSO mechanisms, the OPC UA aggregating server with an SSO component for mapping user legitimation data, which are used in a service call, to identities in a form in which the identities are stored in the subordinate OPC UA servers. In addition, the exemplary method includes utilizing, in order to perform SSO with the aid of the SSO component, user legitimation data belonging to a service call to automatically look for corresponding mapped identities and for affected OPC UA servers and, for each match, to call an ActivateSession service in the respective OPC UA server using the mapped identity, after which the data access desired with the user's service call is established.

An exemplary embodiment provides a client/server system which is set up for communication according to the OPC UA protocol and for single sign-on ( SSO). The exemplary system includes an OPC UA client, and an OPC UA aggregating server connected to the OPC UA client via a first communication network. The exemplary system also includes subordinate OPC UA servers connected to the OPC UA aggregating server via a second communication network. The OPC UA aggregating server comprises a SSO component configured to perform user authentication with SSO mechanisms.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Exemplary embodiments of the present disclosure provide a method and a device which make it possible to integrate single sign-on mechanisms in OPC UA applications.

For example, an exemplary embodiment of the present disclosure provides a method for communication between clients and servers using the OPC UA protocol.

According to an exemplary embodiment of the present disclosure, an OPC UA client transmits all legitimation data (credentials) for a system user, which are required as proof of authorization, to an OPC UA aggregating server. The OPC UA aggregating server automatically authenticates the specific user with respect to all OPC UA servers connected to the aggregating OPC UA server. Both the use of different types of user databases and devices and transparent automatic authentication and fine-grained access control are enabled in a system with an OPC UA aggregating server and subordinate OPC UA servers connected to the OPC UA aggretating server. The inventive integration of single sign-on mechanisms is implemented using an SSO component which is installed in the aggregating OPC UA server and is configured to handle the mechanisms. This SSO component is configured to authenticate the user working on the OPC UA client with respect to all OPC UA servers which are connected to the OPC UA aggregating server and are also referred to as aggregated servers. The SSO component is configured to map and/or convert user identities used by OPC UA clients and in the OPC UA aggregating server to those identities which are stored in the OPC UA servers connected to the OPC UA aggregating server. The SSO component then uses the mapped legitimation data (credentials) to respectively call an ActivateSession service in all OPC UA servers connected to the OPC UA aggregating server.

Figure 1:
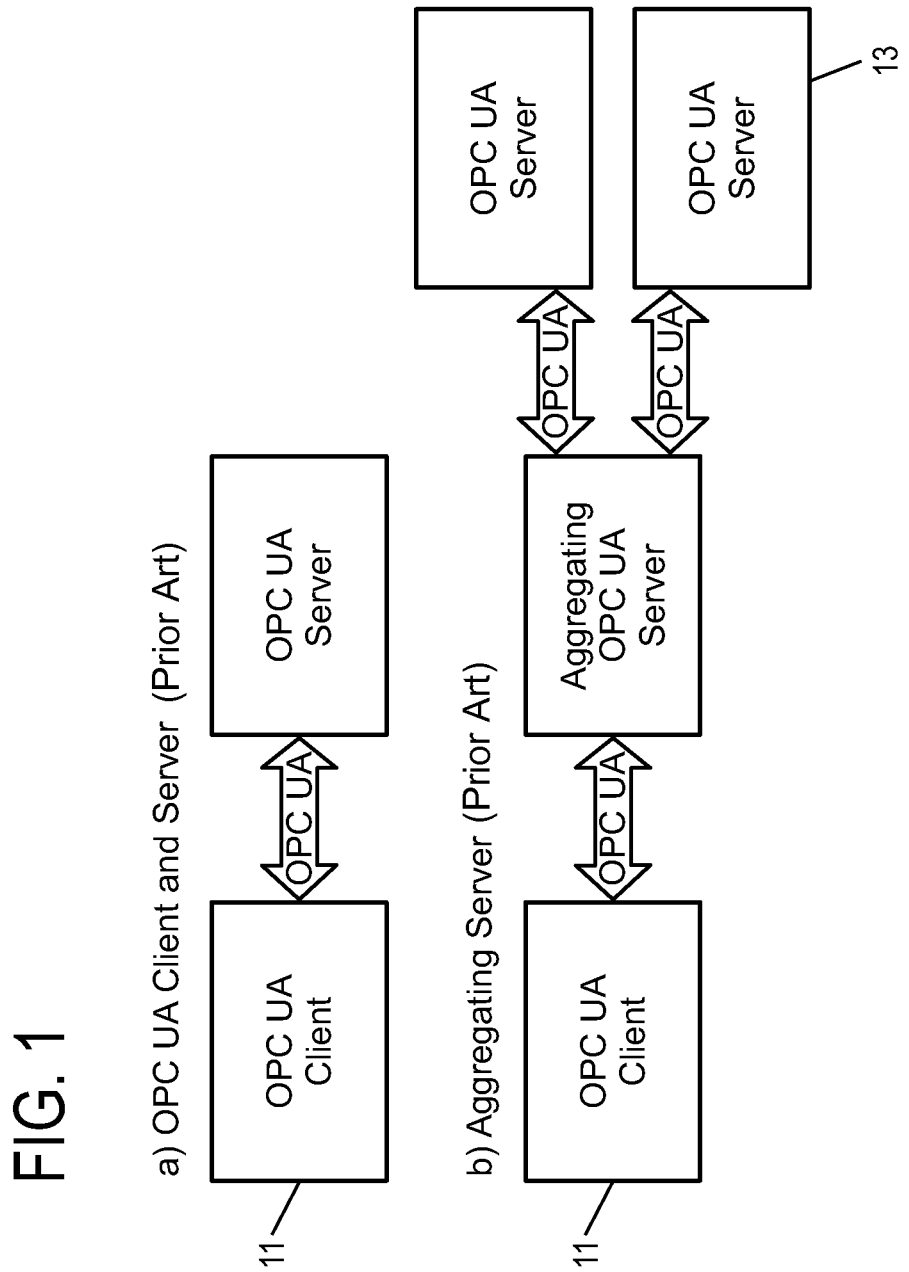
FIG. 1a) shows a known arrangement with an OPC UA client and an OPC UA server, and FIG. 1b) shows a known arrangement with an OPC UA aggregating server.
Figure 2:
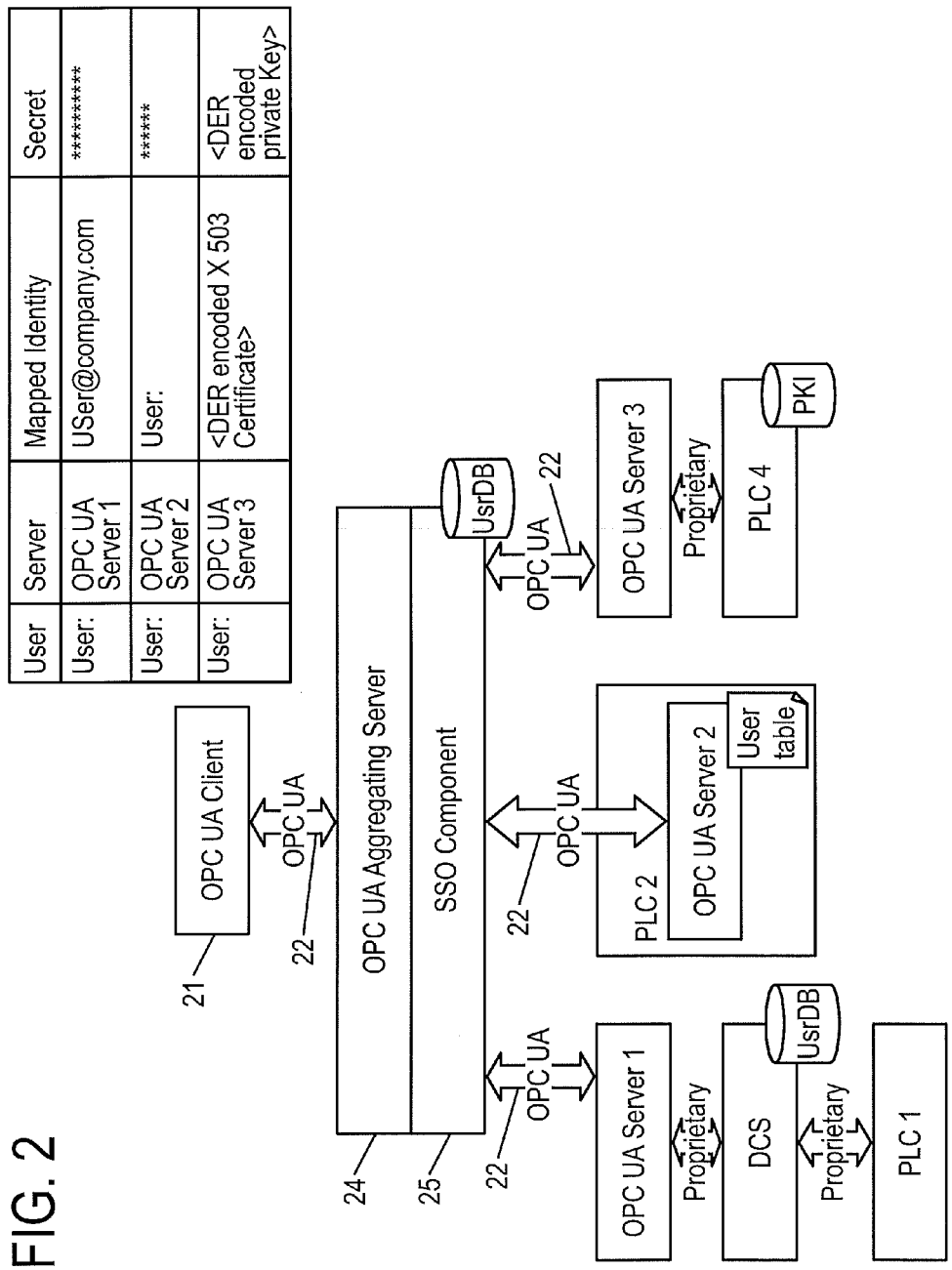
FIG. 2 shows an arrangement with integrated single sign-on (SSO) mechanisms in an OPC UA application, according to an exemplary embodiment of the present disclosure.

FIG. 2 shows, by way of example, an arrangement with integrated single sign-on (SSO) mechanisms in an OPC UA application, according to an exemplary embodiment of the present disclosure. In the illustrated exemplary arrangement, an OPC UA aggregating server 24 contains an SSO component 25 for authenticating the respective user working on an OPC UA client 21, for example the user 1, with respect to subordinate OPC UA servers 1, 2 and 3. Both the OPC UA client 21 and the OPC UA servers 1, 2 and 3, which likewise interact with the OPC UA aggregating server 24, are connected to the OPC UA aggregating server 24 by means of a communication network 22. In the illustrated example, the OPC UA servers 1, 2 and 3 each have access to data providers of different types and with different information and credentials. The OPC UA server 1 provides, for example, data from a process loop control (PLC) which are provided via a process control system (distributed control system) having a central user database, for example, an active directory system. In the OPC UA server 2, an embedded application runs on a PLC with a simple user table in the memory of the controller of the PLC. Finally, the OPC UA server 3, which could be installed on a Linux machine, for example, has access to a PLC which operates using a public key infrastructure (PKI), wherein users are authenticated and authorized with the aid of digital certificates, for example.

The SSO component 25 is connected to a data memory containing information relating to all identities available in the OPC UA servers 1, 2 and 3, and maps the identities to the specific identity used by the user of the OPC UA client 21. In the example according to FIG. 2, a user 1 is illustrated and completes a log-on procedure in the OPC UA client 21. In this case, the user 1 is mapped in the data memory of the SSO component 25 with the user domain User1@company.com according to the OPC UA server 1, and as user 1, as defined in the user table of the OPC UA server 2, and by means of a specific X.509 certificate contained in the certificate trust list of the PKI in the PLC 4 of the OPC UA server 3. The data memory of the SSO component 25 supports all types of identities specified in the OPC UA standard and makes it possible to use different types of user databases in the connected OPC UA servers 1 to 3.

Figure 3:
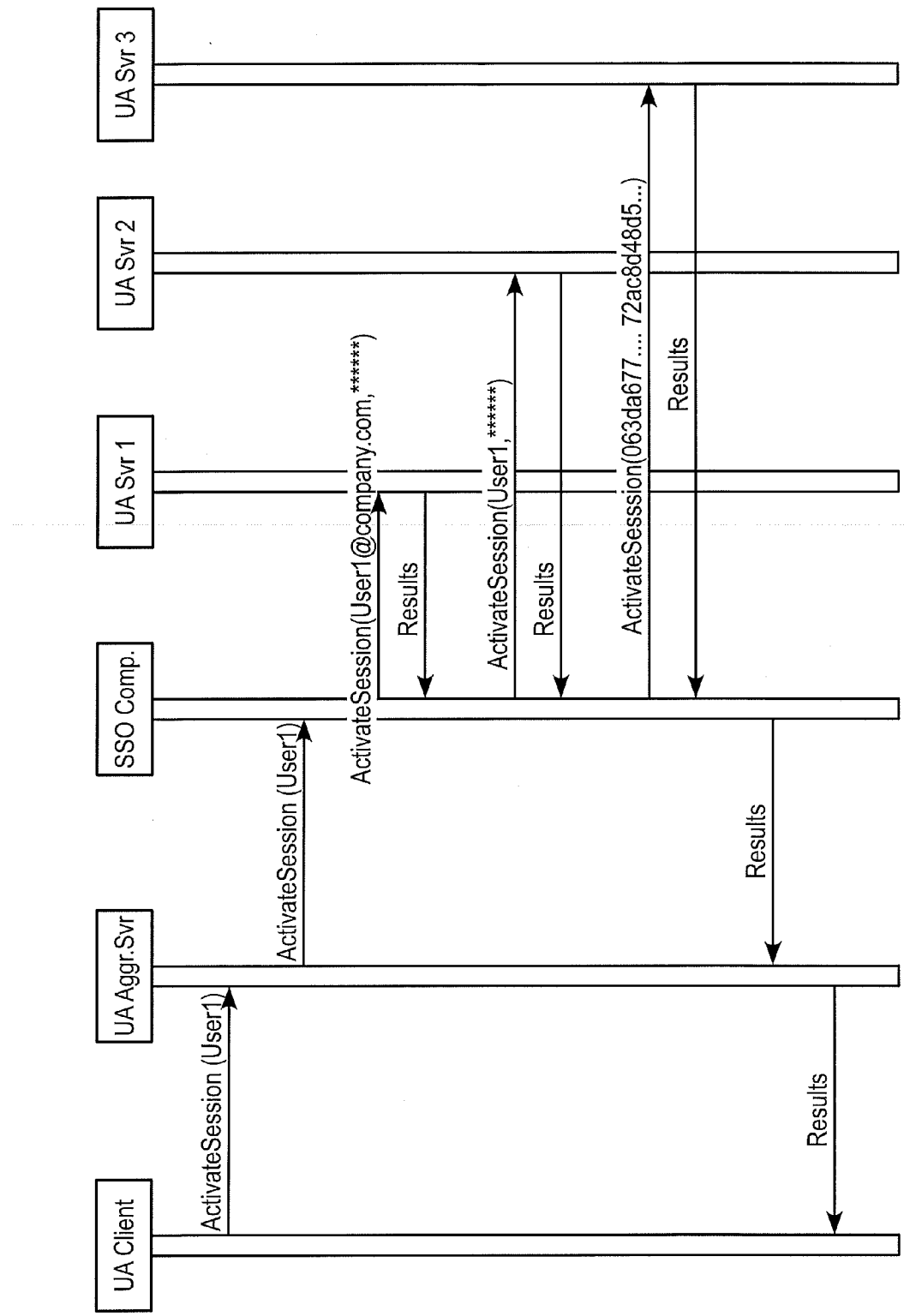
FIG. 3 shows a flowchart corresponding to the exemplary arrangement illustrated in FIG. 2.

Features of an exemplary method according to the present disclosure are explained further with reference to the flowchart which is illustrated by way of example in FIG. 3 and corresponds to the arrangement according to FIG. 2.

When an OPC UA client attempts to establish a connection to the OPC UA aggregating server, the OPC UA client first sets up a secure channel and a session using the services standardized in a secure channel service set and in a session service set. In principle, there are four different procedures for carrying out these preparation steps, one of which needs to be selected depending on the requirements of the respective specific OPC UA product.

According to a first procedure, the aggregating server forwards each service call for establishing a connection to the subordinate OPC UA servers, with the exception of the ActivateSession service call which is forwarded to the SSO component.

In a second procedure, the secure channel is first set up, and session services are called without forwarding them to the aggregating server, with the exception of the ActivateSession service calls. The ActivateSession service call can be the trigger for calling the secure channel and session services of the subordinate OPC UA servers, and the ActivateSession service call can then be forwarded to the SSO component.

A third procedure involves first setting up the secure channel and a session between the OPC UA client and the aggregating server. Each time the client attempts to access data, the aggregating server sets up a connection to that OPC UA server which contains the desired data. The ActivateSession service call is forwarded to the SSO component.

In a fourth procedure, a security channel and a session are likewise first set up between the OPC UA client and the aggregating server. When the client attempts to access data for the first time, the aggregating server sets up connections to the OPC UA servers. These connections which have been set up are terminated when the OPC UA client terminates its connection to the aggregating server or when the connection of the OPC UA client is terminated on account of a time-out.

The individual procedures have different advantages and disadvantages. For example, the third procedure uses resources of the OPC UA servers only for a short time but results in a large overhead when setting up a security channel and the session if services for accessing data are frequently called by the OPC UA server.

The second procedure, for example, needs to use resources of the OPC UA servers for a longer time than the third procedure because the secure channel and the session have to be set up only once for a client session, but only a smaller overhead is occasioned because the secure channel and the session have to be set up only once for a client session. However, secure channel and session service calls have to be kept in the memory of the aggregating server until the secure channels and sessions for the subordinate OPC UA servers have been set up.

The first procedure is simplest to implement but may be problematic with respect to the use of resources if an ActivateSession service call was rejected by the aggregating server because the legitimation data (credentials) forwarded are invalid. In this case, the secure channel and session have already been set up (but not activated) for all OPC UA servers.

The fourth procedure is a good compromise between the use of resources in the OPC UA servers and the overhead needed to set up secure channels and sessions, because the latter are set up only when a client wishes to access data and are kept open until the OPC UA client terminates the connection to the aggregating server.

As mentioned above, the aggregating server is provided with the user legitimation data (credentials) by means of the ActivateSession service call defined in the session service set. The aggregating server then forwards this service call to the SSO component. The SSO component looks for the forwarded user identity in its data memory and looks for mapped identities and for affected OPC UA servers. For each match, the SSO component calls the ActivateSession service in the respective OPC UA server using the mapped user identity.

In the example according to FIG. 2 and FIG. 3, the SSO component calls the ActivateSession service in the OPC UA server 1 by means of User1@company.com and the associated password, in the OPC UA server 2 in a corresponding manner by means of User1 and the associated password, and finally in the OPC UA server 3 by means of DER-encoded bytes of the X.509 certificate and their signature formed using the private key from the certificate issuer.

If it is reported back to the aggregating server by means of results that all ActivateSession service calls were successful, the user is authenticated both in the aggregating server and in the subordinate OPC UA servers, and the aggregating server confirms this to the OPC UA client.

The situation in which the authentication of a user fails in one of the subordinate OPC UA servers, for example, if the legitimation data for the user are no longer valid for the latter, may also occur. As long as the user can be authenticated at least in one of the subordinate OPC UA servers, the user can access data in the relevant server or servers anyway.

Figure 4:
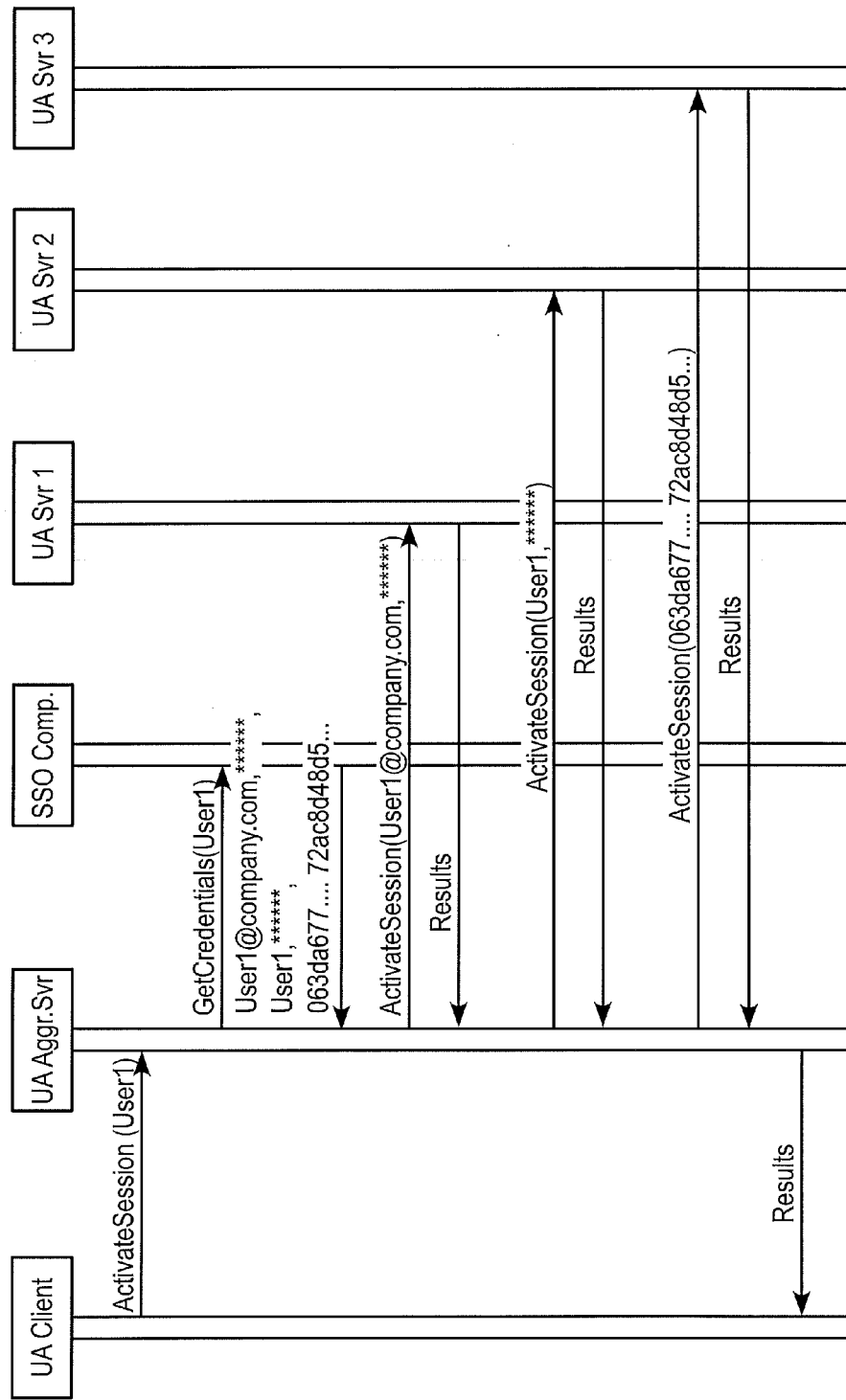
FIG. 4 shows an alternative flowchart corresponding to the exemplary arrangement illustrated in FIG. 2.

FIG. 4 shows a flowchart for another exemplary embodiment corresponding to the arrangement according to FIG. 2 FIG. 4 illustrates that an ActivateSession service call for a user 1 is transmitted from the OPC UA client to the OPC UA aggregating server. The aggregating server determines the mapped legitimation data for the relevant user (here User 1) only using a proprietary interface function of the SSO component. The aggregating server then directly calls the ActivateSession services in the subordinate OPC UA servers. This exemplary arrangement simplifies the handling of internal communication, which is why an SSO component could also be dispensed with. The required multiplexing of the ActivateSession service call could be carried out in any OPC UA server which supports SSO. If this functionality is thus removed from an SSO component which could, however, be reused in any OPC UA server, this functionality would have to be implemented again in each OPC UA server.

Another exemplary embodiment of the above-described device and method could involve introducing a concept with super-users as agents for the aggregating server. According to this exemplary embodiment, a super-user with all rights to access data in all subordinate OPC UA servers is used each time to set up a client connection to the aggregating server. This means that the aggregating server selects a special identity for setting up connections to the subordinate OPC UA servers independently of the user identity.

Such a solution results in simpler user management in the aggregating server but contravenes general design rules for least privileges. In addition, it results in higher security risks if a hacker were successful in hijacking a session of the aggregating server. The hacker would always have access to all subordinate OPC UA servers.

Features of the aforementioned exemplary embodiments were described above with respect to functional operations performed by the various components illustrated in the exemplary arrangement of FIG. 2. The components of the exemplary arrangement can each include a processor (e.g., a computer processor, such as general-purpose processor and/or an application specific integrated circuit (ASIC)) which can execute computer-readable instructions recorded on a non-transitory computer-readable recording medium (e.g., a non-volatile recording memory, such as a hard disk, a ROM, a flash memory, optical memory, etc.) for carrying out any of the features of the exemplary embodiments described above.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for integrating single sign-on (SSO) mechanisms in a client/server system with communication according to the OPC UA protocol and for performing SSO for user authentication in the system, wherein the system includes an OPC UA client which is connected to an OPC UA aggregating server, which in turn is connected to a plurality of subordinate OPC UA servers by means of a communication network, the method comprising:

provinding, in order to integrate the SSO mechanisms, the OPC UA aggregating server with an SSO component for mapping user legitimation data, which are used in a service call, to identities in a form in which the identities are stored in the plurality of subordinate OPC UA servers; and utilizing, in order to perform SSO with the aid of the SSO component, user legitimation data belonging to a service call to automatically look for corresponding mapped identities and for affected OPC UA servers and, for each match, to call an ActivateSession service in the respective OPC UA server using the mapped identity, after which the data access desired with the user's service call is established.

2. The method as claimed in claim 1, comprising:
performing SSO on the basis of a service call originating from the OPC UA client, wherein the performing comprises:

setting up a secure channel and a session between the OPC UA client and the OPC UA aggregating server using standard services defined in a secure channel service set and a session service set;

providing the OPC UA aggregating server with user legitimation data using a standard ActivateSession service call defined in the session service set;

forwarding the service call and the user legitimation data to the SSO component; and using, in the SSO component, the user legitimation data to look for matching stored mapped user identities and for affected OPC UA servers and, for each match, to call the ActivateSession service in the respective OPC UA server using the mapped identity.

3. The method as claimed in claim 1, comprising forwarding, by the OPC UA aggregating server:

an ActivateSession service call to the SSO component; and other service calls for establishing a connection with the plurality of subordinate OPC UA servers to the identities stored in the plurality of subordinate OPC UA servers.

4. The method as claimed in claim 1, comprising:

setting up a secure channel between the OPC UA client and the OPC UA aggregating server using standard services defined in a secure channel service set;

setting up a session between the OPC UA client and the OPC UA aggregating server using session services defined in a session service set without forwarding calls to the session services to the OPC UA aggregating server, wherein an ActivateSession service call is not in the session service set;

calling standard services and session services of the plurality of subordinate OPC UA servers; and in response to detecting an ActivateSession service call, forwarding the ActivateSession service call to the SSO component.

5. The method as claimed in claim 1, comprising setting up a secure channel and a session between the OPC UA client and the OPC UA aggregating server using standard services defined in a secure channel service set and a session service set;

in response to detecting a client attempt to access data, setting up, by the OPC UA aggregating server, a connection to a OPC UA server which contains the desired data; and forwarding an ActivateSession service call to the SSO component.

6. The method as claimed in claim 1, comprising setting up a secure channel and a session between the OPC UA client and the OPC UA aggregating server using standard services defined in a secure channel service set and a session service set to establish a connection between the OPC UA client and the OPC UA aggregating server;

in response to detecting a first attempt by a client to access data, setting up, by the OPC UA aggregating server, a connection to a OPC UA server which contains the desired data;

terminating the connection to the OPC UA server when the connection between the OPC UA client and the OPC UA aggregating server is terminated by the OPC UA client or terminated on account of a time-out.

7. A client/server system which is set up for communication according to the OPC UA protocol and for single sign-on (SSO), the system comprising:

an OPC UA client;

an OPC UA aggregating server connected to the OPC UA client via a first communication network; and a plurality of subordinate OPC UA servers connected to the OPC UA aggregating server via a second communication network, wherein the OPC UA aggregating server comprises a SSO component configured to:

perform user authentication with SSO mechanisms;

map user legitimation data, which are used in a service call of a user, to identities in a form in which the identities are stored in the plurality of subordinate OPC UA servers; and automatically look for corresponding mapped identities and for affected OPC UA servers using user legitimation data belonging to a service call and, for each match, to call an ActivateSession service in the respective OPC UA server using the mapped identity, after which the data access desired with the user's service call is established.

8. The client/server system as claimed in claim 7, wherein the SSO component is configured to access stored information relating to all user identities available in the OPC UA servers and to map the identities to the identities used by users of the OPC UA client.

9. The client/server system as claimed in claim 8, wherein:

the OPC UA client and the OPC UA aggregating server are configured to provide the OPC UA aggregating server and the SSO component with the user legitimation data using a standard ActivateSession service call defined in a session service set.

10. The client/server system as claimed in claim 7, wherein:

the OPC UA client and the OPC UA aggregating server are configured to provide the OPC UA aggregating server and the SSO component with the user legitimation data using a standard ActivateSession service call defined in a session service set.

11. The client/server system as claimed in claim 7, wherein the first communication network connecting the OPC UA aggregating server and the OPC UA client is independent from the second communication network connecting the subordinate OPC UA servers and the OPC UA aggregating server.

12. The client/server system as claimed in claim 7, wherein the first communication network connecting the OPC UA aggregating server and the OPC UA client is part of the second communication network connecting the subordinate OPC UA servers and the OPC UA aggregating server.

* * * * *